(12) United States Patent
Eilers

(10) Patent No.: US 11,698,148 B1
(45) Date of Patent: Jul. 11, 2023

(54) ROTARY BALL VALVES WITH NOISE ATTENUATORS

(71) Applicant: Fisher Controls International LLC, Marshalltown, IA (US)

(72) Inventor: Daniel Eilers, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/649,891

(22) Filed: Feb. 3, 2022

(51) Int. Cl.
*F16K 47/04* (2006.01)
*F16K 5/06* (2006.01)

(52) U.S. Cl.
CPC .......... *F16K 47/045* (2013.01); *F16K 5/0605* (2013.01)

(58) Field of Classification Search
CPC .............................. F16K 47/045; F16K 5/0605
See application file for complete search history.

(56) References Cited

U.S. PATENT DOCUMENTS

| | | | | |
|---|---|---|---|---|
| 4,364,415 A | * | 12/1982 | Polon .................... | F16K 47/045 251/127 |
| 4,479,510 A | * | 10/1984 | Bey ........................ | F16K 47/02 251/127 |
| 5,332,004 A | * | 7/1994 | Gethmann ............ | F16K 47/045 251/127 |
| 8,141,843 B2 | * | 3/2012 | Rimboym ............. | F16K 5/0605 251/315.01 |
| 10,100,947 B2 | | 10/2018 | Gattavari | |

* cited by examiner

*Primary Examiner* — Michael R Reid
(74) *Attorney, Agent, or Firm* — Hanley, Flight & Zimmerman, LLC

(57) ABSTRACT

Rotary ball valves with noise attenuators are disclosed herein. An example rotary ball valve includes a valve body defining a passageway between an inlet and an outlet, a ring-shaped seal in the passageway, a closure member in the passageway, the closure member rotatable in the passageway relative to the seal, and a noise attenuator coupled to the closure member in the passageway. The closure member and the noise attenuator are rotatable between a closed position, a fully open position, and a plurality of intermediate positions between the closed position and the fully open position. The noise attenuator includes walls that are spaced apart from each other. The walls at least partially form a plurality of channels. The channels are aligned with the passageway when the noise attenuator is in the fully open position. The walls include a first wall that is curved such that such that when the noise attenuator is in a first intermediate position, an edge of the first wall is aligned with the seal.

19 Claims, 13 Drawing Sheets

ROTARY BALL VALVES WITH NOISE ATTENUATORS

FIELD OF THE DISCLOSURE

This disclosure relates generally to valves and, more particularly, to rotary ball valves with noise attenuators.

BACKGROUND

Valves, fluid regulators, and other process control devices are commonly distributed throughout process control systems and/or fluid distribution systems to control flow rates and/or pressures of various fluids (e.g., liquids, gases, etc.). Process control devices may be used to change a characteristic of a fluid such as a pressure, a temperature, a flow rate, etc. This change in a characteristic of the fluid often causes a significant amount of audible noise. For instance, rotary ball valves include a closure member that moves relative to a seal to open or close a flow path and/or regulate the flow rate through the valve. However, the fluid flowing through the valve often creates a significant amount of audible noise.

SUMMARY

An example rotary ball valve disclosed herein includes a valve body defining a passageway between an inlet and an outlet, a ring-shaped seal in the passageway, a closure member in the passageway, the closure member rotatable in the passageway relative to the seal, and a noise attenuator coupled to the closure member in the passageway. The closure member and the noise attenuator are rotatable between a closed position, a fully open position, and a plurality of intermediate positions between the closed position and the fully open position. The noise attenuator includes walls that are spaced apart from each other. The walls at least partially form a plurality of channels. The channels are aligned with the passageway when the noise attenuator is in the fully open position. The walls include a first wall that is curved such that such that when the noise attenuator is in a first intermediate position, an edge of the first wall is aligned with the seal.

An example rotary ball valve disclosed herein includes a valve body defining a passageway between an inlet and an outlet, a ring-shaped seal in the passageway, a closure member in the passageway, the closure member rotatable in the passageway relative to the seal, and a noise attenuator coupled to the closure member in the passageway. The closure member and the noise attenuator are rotatable between a closed position, a fully open position, and a plurality of intermediate positions between the closed position and the fully open position. The noise attenuator includes a plurality of channels. The noise attenuator including walls that are spaced apart from each other. The walls at least partially define the channels. The walls include a first wall having an elliptically-shaped curvature such that when the noise attenuator is in a first intermediate position, the elliptically-shaped curvature of the first wall matches a curvature of the seal in an axial direction.

An noise attenuator for a rotary ball valve disclosed herein includes a first outer wall, a second outer wall, first walls extending between the first outer wall and the second outer wall, the first walls spaced apart from each other, and second walls. At least some of the second walls extend between adjacent ones of the first walls. The first and second outer walls, the first walls, and the second walls define a plurality of channels. Each of the first walls has an elliptically-shaped curvature such that edges of respective ones of the first walls align with a seal in the rotary ball valve at different rotational angles of the noise attenuator.

BRIEF DESCRIPTION OF THE DRAWINGS

In FIG. 1, the example closure member is in a closed position.

Figure 1:
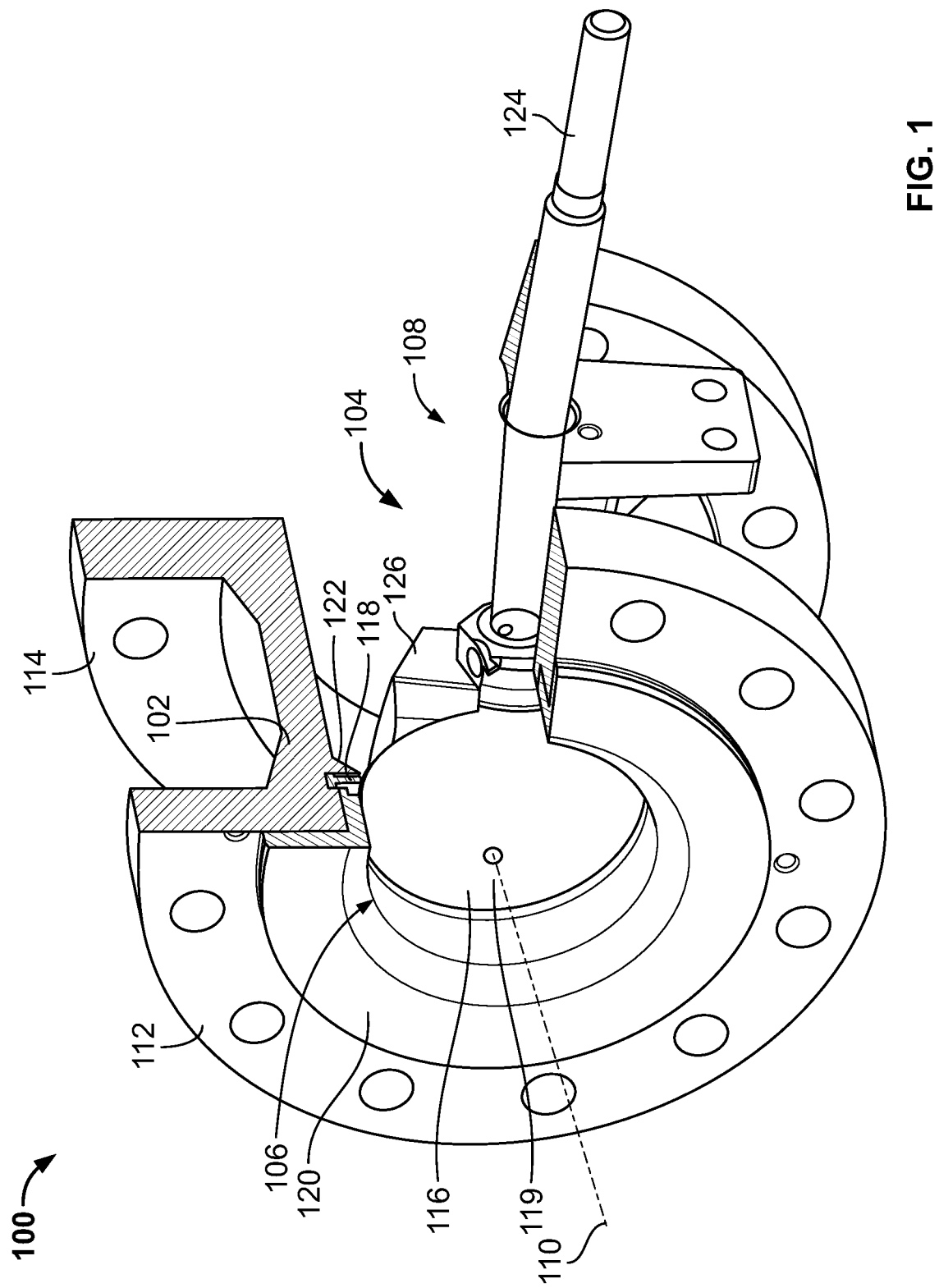
FIG. 1 is a perspective view of an example rotary ball valve including an example closure member and an example noise attenuator constructed in accordance with the teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in contact with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Many known process control and/or fluid distribution systems (e.g., power generation systems, petroleum refinery systems, etc.) employ process control devices or field devices to affect the flow of fluid. For example, valves are a common type of process control device that are used to control the flow of fluid (e.g., liquids, gases, etc.) between an upstream source and a downstream location. Some known valves, such as ball valves, include a closure member or ball that is rotatable between a closed position that blocks fluid flow, a fully open position that allows maximum fluid flow, and one or more intermediate positions that allow partial fluid flow. In some instances, when the ball valve is in the fully open position or an intermediate position, the flow of fluid through the valve creates a significant amount of audible noise (e.g., greater than about 85 decibels). The noise may be caused by the aerodynamic flow, the pressure drop, cavitation, and/or other fluid flow characteristics.

Disclosed herein are example noise attenuators and example rotary ball valves that employ the example noise attenuators. The example noise attenuators disclosed herein affect the flow of fluid through the valve to thereby reduce or dampen audible noise. In particular, the example noise attenuators reduce unacceptable high noise levels (e.g., greater than about 85 decibels) produced by the rotary ball valve to more acceptable low noise levels (e.g., less than about 85 decibels). The example noise attenuators include elliptically curved walls that enable certain channels (or rows of channels) of the noise attenuator to be fully open or closed to the fluid flow at certain intermediate positions of the closure member and the noise attenuator. This enables characterization of the noise reduction and a more efficient transition between rows of channels. This also allows customization of each of the rows of channels to achieve specific flow characteristics, such as different noise or cavitation reduction at certain rotational angles of the closure member and the noise attenuator.

An example rotary ball valve disclosed herein includes a valve body defining a passageway between an inlet and an outlet. The example rotary ball valve includes a ring-shaped seal in the passageway and a closure member, such as a ball or ball segment, that is rotatable in the passageway relative to the seal. The closure member is engaged with and slides against the seal. The closure member is rotatable between a closed position, a fully open position, and a plurality of intermediate positions between the closed position and the fully open position. The example rotary ball valve also includes a noise attenuator that is coupled to the closure member in the passageway. The noise attenuator is rotatable with the closure member between the closed position, the fully open position, and the intermediate positions. When the closure member is in the fully open position or one of the intermediate positions, the noise attenuator is disposed in the fluid flow path and affects the flow characteristics of the fluid to reduce or dampen noise. In some examples, the noise attenuator includes first walls that are spaced apart from each other. The first walls at least partially define or form a plurality of channels. In some examples, the noise attenuator includes second walls between adjacent ones of the first walls, which further define channels or rows of channels between adjacent ones of the first walls. The first walls are straight or linear in their lengthwise direction. As such, when the closure member and the noise attenuator are in the fully open position, the channels are parallel to or aligned with the fluid flow through the passageway. However, the first walls are curved in their transverse direction. In particular, each of the walls has an elliptically-shaped or oval-shaped curvature. As a result, when the closure member and the noise attenuator are rotated to certain intermediate positions, an edge of one of the walls is aligned with the seal. As such, certain rows of channels may be fully open at certain rotational angles of the closure member. This enables the rows of channels to be customized to achieve certain flow characteristics (e.g., noise damping, activation, etc.). For example, the valve can be customized to achieve certain noise or cavitation damping levels at discrete rotational angles of the closure member.

FIG. 1 is a perspective view of an example rotary ball valve 100 constructed in accordance with the teachings of this disclosure. In the illustrated example, the rotary ball valve 100 includes a valve body 102 defining a passageway 104 between an inlet 106 and an outlet 108. In the illustrated example, a quarter section of the valve body 102 has been cross-sectioned. The passageway 104 defines a central axis 110. When the rotary ball valve 100 is in an open position or state, fluid flows through the passageway 104 in an axial direction along the central axis 110 between the inlet 106 and the outlet 108.

In this example, the valve body 102 has a first flange 112 at the inlet 106 and a second flange 114 at the outlet 108. The first and second flanges 112, 114 can be used to couple (e.g., via one or more bolts) the rotary ball valve 100 between upstream and downstream pipes or devices. The rotary ball valve 100 can be used to control a flow of fluid between the inlet 106 and the outlet 108 and, thus, between the upstream and downstream pipes or devices. The rotary ball valve 100 can be used in connection with any type of fluid, such as water, oil, natural gas, etc.

To control the flow of fluid through the passageway 104, the rotary ball valve 100 includes a closure member 116 (sometimes referred to as a flow control member) in the passageway 104. The closure member 116 is moveable in the passageway 104 to regulate or control the flow of fluid through the passageway 104. In the illustrated example, the rotary ball valve 100 includes a ring-shaped seal 118 in the passageway 104. The seal 118 is coupled to the valve body 102. In the illustrated example, the rotary ball valve 100 has a seal retainer 120 disposed in the inlet 106. The seal retainer 120 clamps the seal 118 between the seal retainer 120 and a shoulder 122 of the valve body 102. In other examples, the seal 118 can be coupled to the valve body 102 in other manners (e.g., threaded fasteners, an adhesive, etc.).

The closure member 116 is rotatable in the passageway 104 relative to the seal 118. In particular, the closure member 116 is engaged with the seal 118 and slides against the seal 118 as the closure member 116 rotates. The closure member 116 is rotatable between a closed position, a fully open position, and a plurality of intermediate positions between the closed position and the fully open position. FIG. 1 shows the closure member 116 in the closed position. In the closed position, an outer surface 119 of the closure member 116 is engaged with the entire seal 118, which prevents fluid flow through the seal 118 and, thus, through the passageway 104 between the inlet 106 and the outlet 108.

Figure 2:
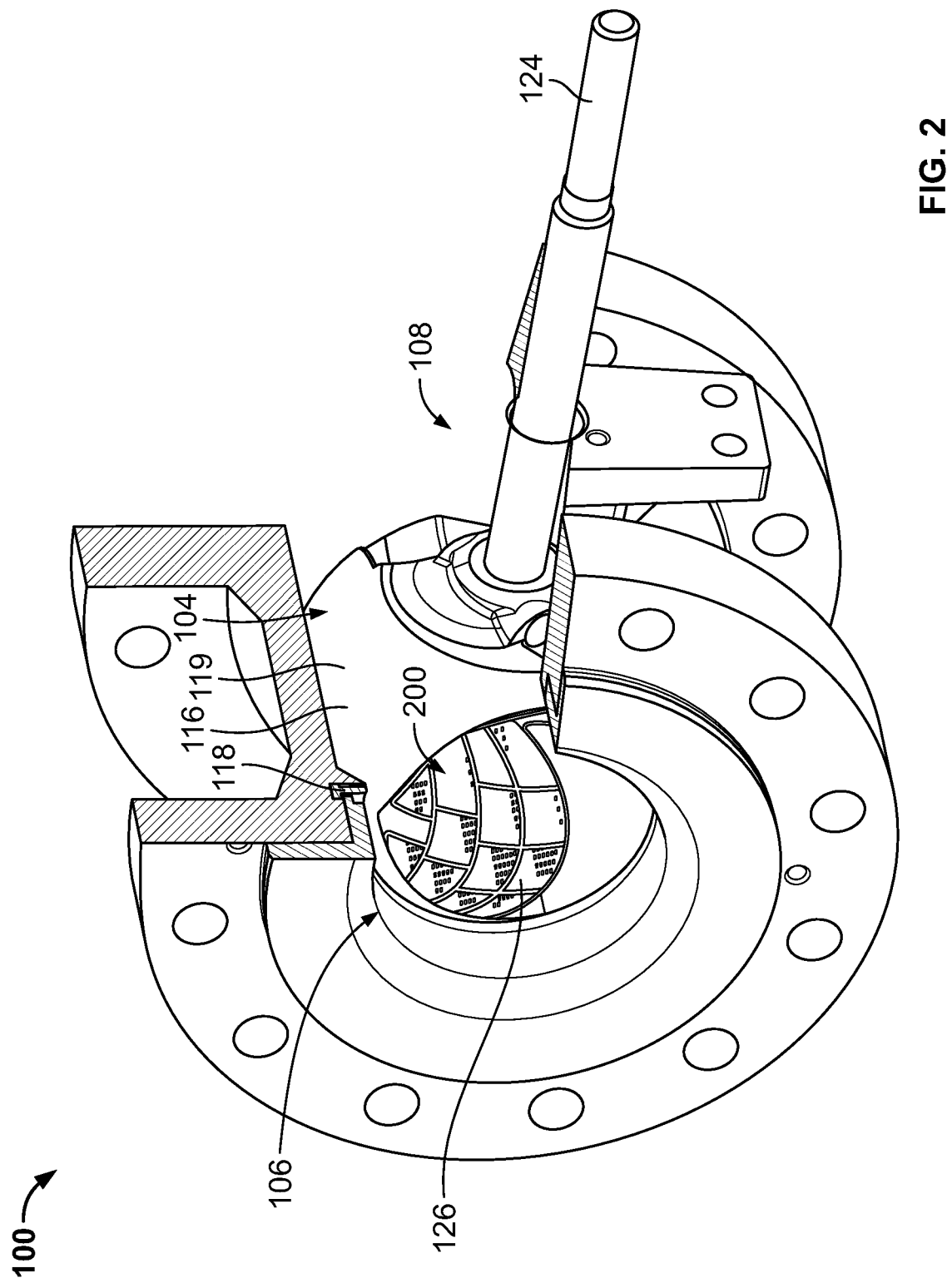
FIG. 2 shows the example closure member of FIG. 1 in a fully open position.

FIG. 2 shows the closure member 116 in the fully open position. In this example, the closure member 116 has been rotated about 90° from the closed position (FIG. 1) to the fully open position (FIG. 2). In the fully open position, only a small portion of the outer surface 119 of the closure member 116 is engaged with the seal 118 (and in other examples none of the outer surface 119 may be engaged with the seal 118 in the fully open position). Therefore, fluid can flow freely through the seal 118 and, thus, through the passageway 104 between the inlet 106 and the outlet 108. The closure member 116 can also be rotated to a plurality of rotational positions/angles, referred to as intermediate positions, between the closed position and the fully open position. In the intermediate positions, the passageway 104 is only partially opened. The closure member 116 can be rotated to one of the intermediate positions to regulate the flow of fluid through the passageway 104.

In the illustrated example of FIGS. 1 and 2, the rotary ball valve 100 includes a shaft 124 coupled to the closure member 116. The shaft 124 extends through the valve body 102. The shaft 124 can be rotated to rotate the closure member 116 in the passageway 104. The shaft 124 can be rotated manually (e.g., via a hand wheel) or by an automated device. For example, an actuator can be coupled to the shaft 124 and activated to rotate the shaft 124 and thereby control the rotary ball valve 100. In some examples, the closure member 116 can be rotated 90° clockwise or counter-clockwise to move between the closed and fully open positions. In this example, the closure member 116 is a sphere or ball segment. However, in other examples, the closure member 116 may be implemented by a full ball or sphere with an opening or channel through the ball.

In some instances, the fluid flowing through the rotary ball valve 100 generates a significant audible noise (e.g., aerodynamic or cavitation noise) when the rotary ball valve 100 is in the fully open position or one of the intermediate positions. Therefore, the rotary ball valve 100 includes a noise attenuator 126 to reduce or attenuate the noise caused by the flow of fluid through the rotary ball valve 100. The noise attenuator 126 is disposed in the passageway 104. The noise attenuator 126 is coupled to and rotates with the closure member 116. In particular, the noise attenuator 126 rotates with the closure member 116 between the closed position (FIG. 1), the fully open position (FIG. 2), and the plurality of intermediate positions between the closed position and the fully open position.

In the illustrated example of FIG. 2, the noise attenuator 126 includes a plurality of channels 200. When the closure member 116 and the noise attenuator 126 are in the closed position, the noise attenuator 126 is blocked from the flow of fluid by the closure member 116. When the closure member 116 and the noise attenuator 126 are rotated to one of the intermediate positions, certain ones of the channels 200 of the noise attenuator 126 are exposed to the flow of fluid. The fluid flows through one or more of the channels 200 defined by the noise attenuator 126, which reduces or dampens the noise caused by the flow of fluid. In particular, instead of allowing a large uncontrolled jet through the noise attenuator 126, the channels 200 break up the jet into smaller controlled jets or flow streams. This reduces turbulence and, thus, reduces noise.

Figure 3:
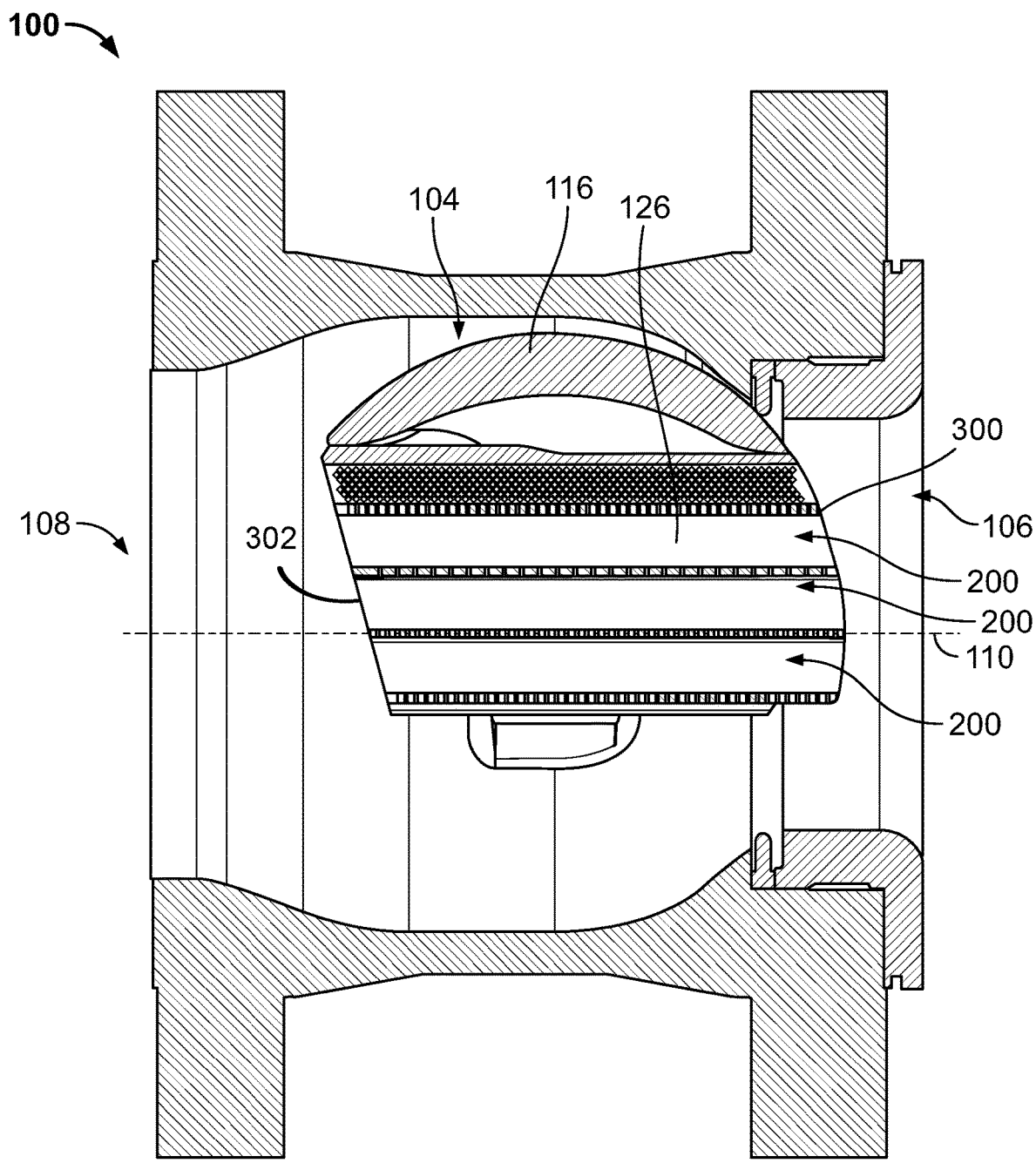
FIG. 3 is a cross-sectional view of the example rotary ball valve of FIGS. 1 and 2 with the example closure member in the fully open position.

When the closure member 116 and the noise attenuator 126 are in the fully open position, the channels 200 are aligned with the passageway 104. For example, FIG. 3 is a cross-sectional view of the rotary ball valve 100 showing the closure member 116 and the noise attenuator 126 in the fully open position. The noise attenuator 126 has a first end 300 and a second end 302 opposite the first end 300. The channels 200 extend between the first end 300 and the second end 302. When the noise attenuator 126 is in the fully open position, the first end 300 faces the inlet 106 and the second end 302 faces the outlet 108. As shown in FIG. 3, when the noise attenuator 126 is in the fully open position, the channels 200 are parallel to or aligned with the central axis 110. As such, the fluid can flow in a relatively free or unobstructed manner through the passageway 104 between the inlet 106 and the outlet 108.

Figure 4:
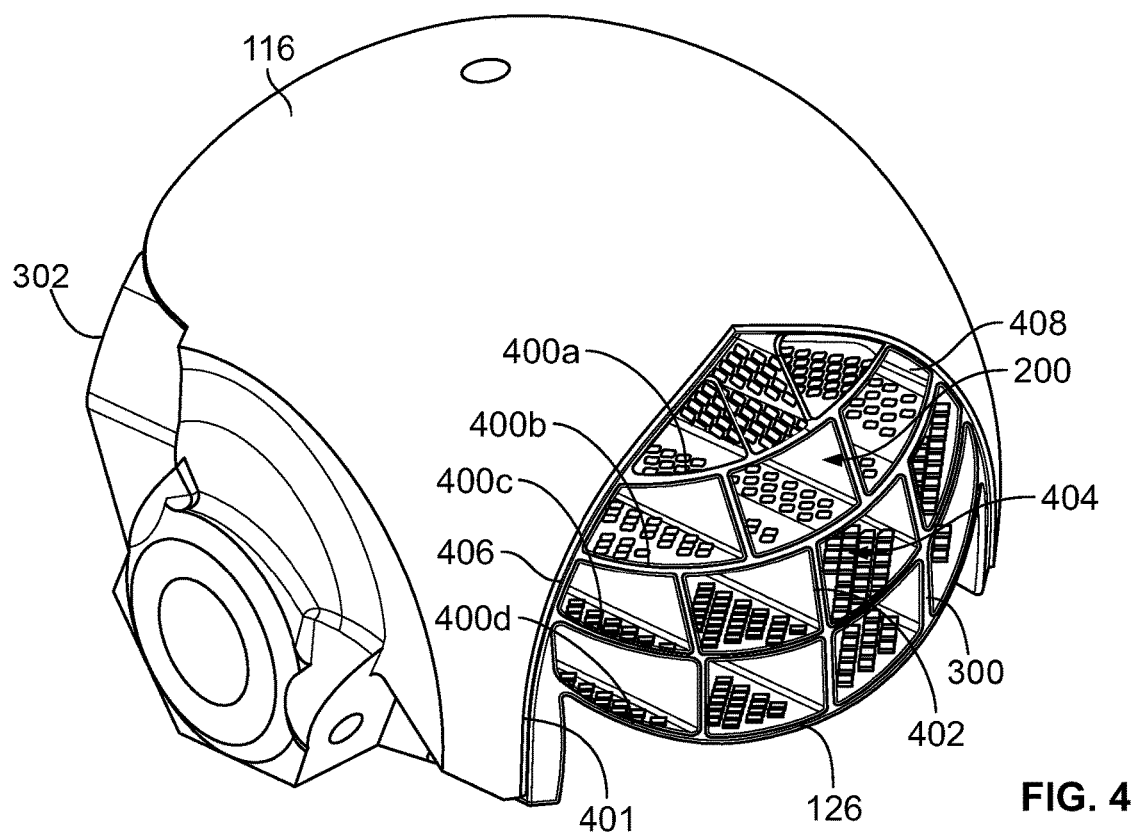
FIGS. 4-6 are perspective views of the example closure member and the example noise attenuator of FIG. 1.
Figure 5:
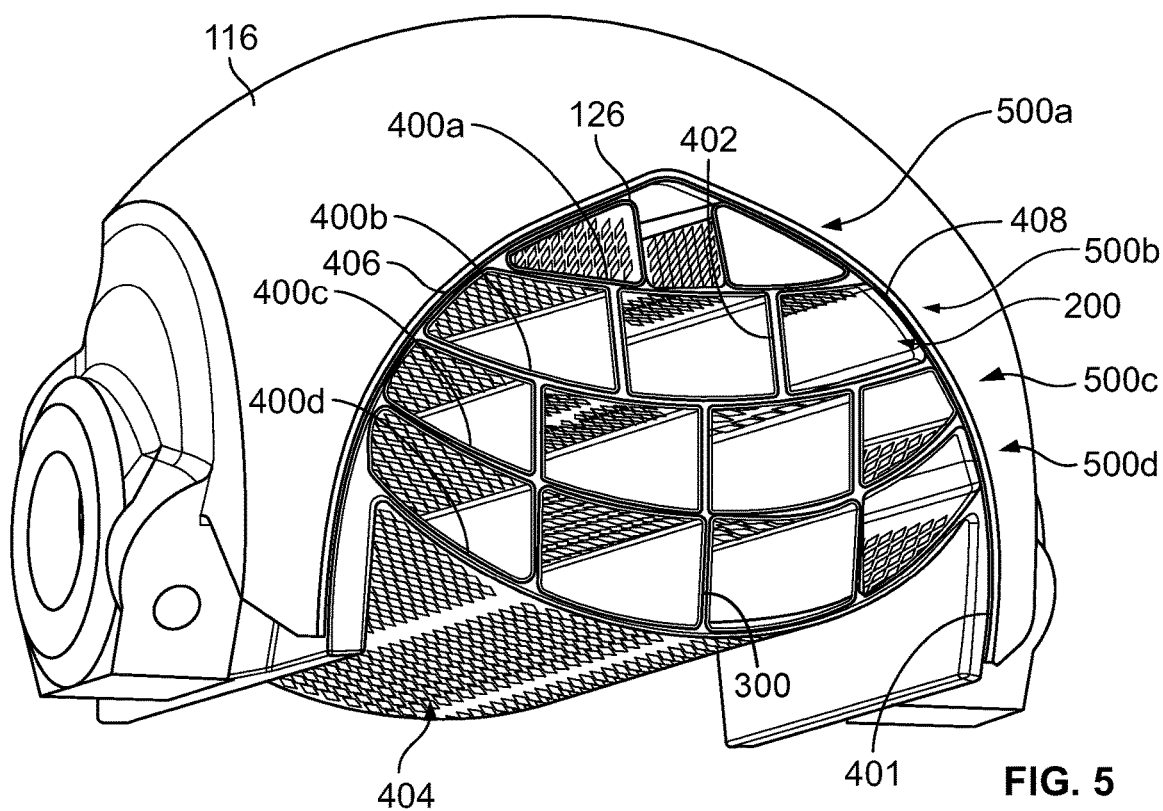
Figure 6:
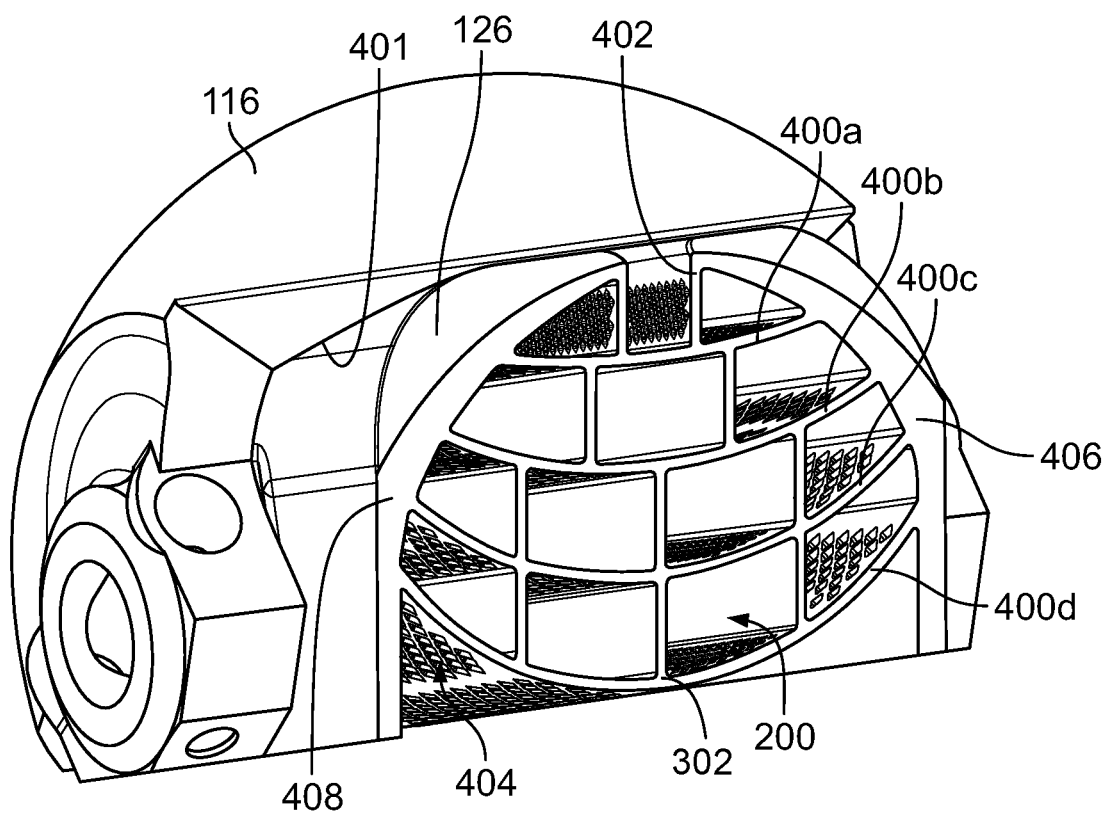

FIGS. 4-6 are perspective views of the closure member 116 and the noise attenuator 126. FIGS. 4 and 5 show the side of the closure member 116 and the noise attenuator 126 (e.g., the first end 300) facing the inlet 106 when the closure member 116 and the noise attenuator 126 are in the fully open position. FIG. 6 shows the opposite side of the closure member 116 and the noise attenuator 126 (e.g., the second end 302).

In some examples, the closure member 116 and the noise attenuator 126 are two separate parts or components that are coupled together. In particular, the noise attenuator 126 is coupled to an inner surface 401 of the closure member 116. The closure member 116 and the noise attenuator 126 can be coupled via welding, fasteners (e.g., bolts), an adhesive, friction fit, etc. In other examples, the closure member 116 and the noise attenuator 126 can be constructed as a single unitary part or component. For example, the closure member 116 and the noise attenuator 126 can be molded or machined from a single piece of material. In some examples, the closure member 116 and the noise attenuator 126 can be constructed as a single unitary part or component via additive manufacturing (sometimes referred to as 3D printing). In some examples, the closure member 116 and/or the noise attenuator 126 are constructed of metal, such as steel or steel alloy. In other examples, the closure member 116 and/or the noise attenuator 126 can be constructed of other materials (e.g., titanium, aluminum, etc.).

In the illustrated example of FIGS. 4-6, the noise attenuator 126 includes first walls 400a-400d (which includes a first wall 400a, a second wall 400b, a third wall 400c, and a fourth wall 400d). The first walls 400a-400d are spaced apart from each other. The first walls 400a-400d at least partially form or define the channels 200 (one of which is referenced in each of FIGS. 4-6). When the closure member 116 and the noise attenuator 126 are in an intermediate position or the fully open position, fluid flows through one or more of the channels 200, which reduces or attenuates the noise caused by the flow of fluid. In some examples, the first walls 400a-400d are spaced equidistant from each other. In other examples, the first walls 400a-400d are spaced at different distances to each other. When the closure member 116 and the noise attenuator 126 are in an intermediate position or the fully open position, the first walls 400a-400d extend generally across (e.g., transverse to) the passageway 104 (FIG. 1). In this example, the first walls 400a-400d include four walls. However, in other examples, the first walls 400*a*-400*d* can include more or fewer walls (e.g., one wall, two walls, three walls, five walls, etc.).

In the illustrated example, the noise attenuator 126 includes second walls 402 (one of which is referenced in each of FIGS. 4-6). At least some of the second walls 402 extend between adjacent ones of the first walls 400*a*-400*d*. The second walls 402 can be aligned or offset from each other. Some of the second walls 402 also extend between the first wall 400*a* and the inner surface 401 of the closure member 116.

Figure 12:
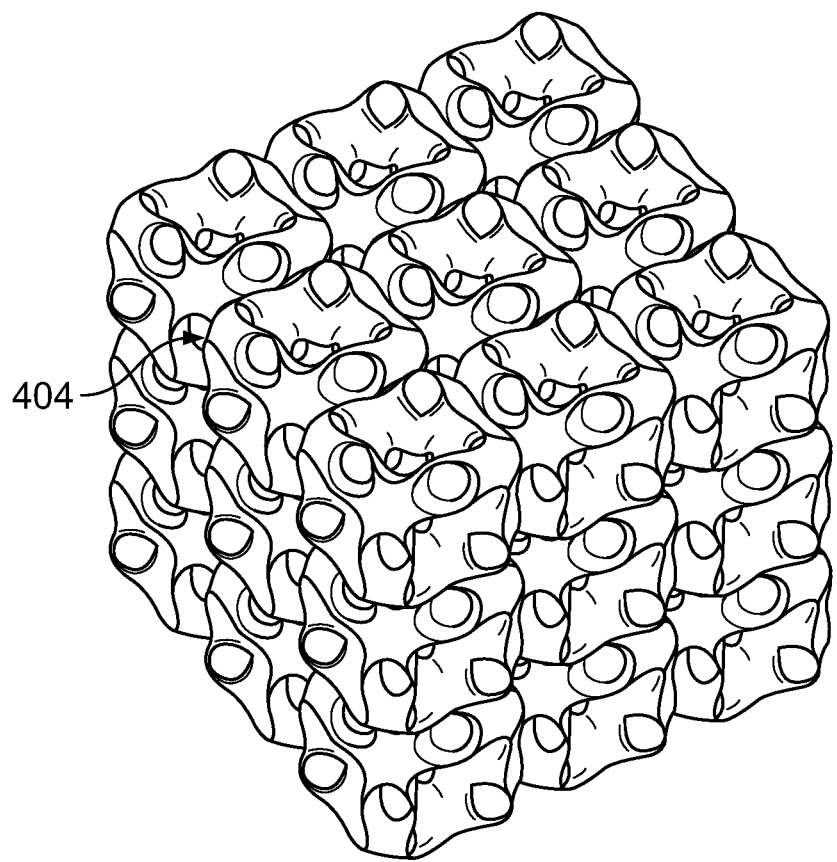
FIG. 12 illustrates an example triply periodic lattice structure that can be used as walls of the example noise attenuator.

In the illustrated example, the first walls 400*a*-400*d* have openings 404 (one of which is referenced in each of FIGS. 4-6). The openings 404 enable fluid to flow between the channels 200 (e.g., across the walls 400*a*-400*d* between adjacent ones of the channels 200). This allows pressure distribution into other channels 200, which helps reduce the noise generated by the rotary ball valve 100. In this example, the openings 404 are square-shaped. However, in other examples, the openings 404 can have different shapes (e.g., circular, triangular, etc.). In some examples, the openings 404 are arranged in a specific pattern. In some examples, the first walls 400*a*-400*d* have a triply periodic lattice structure. An example triply periodic lattice structure is shown in FIG. 12. The triply periodic lattice structure forms the openings 404 (e.g., via a network of channels or voids through the material). In some examples, the triply periodic lattice structure is constructed via an additive manufacturing process (e.g., 3D printing). In the illustrated example, the second walls 402 do not have openings. However, in other examples, the second walls 402 can also have openings similar to the first walls 400*a*-400*d*.

In the illustrated example, the noise attenuator 126 includes a first outer wall 406 and a second outer wall 408. The first and second outer walls 406, 408 are engaged with the inner surface 401 of the closure member 116. In the illustrated example, each of the first walls 400*a*-400*d* extends between the first and second outer walls 406, 408. The first and second outer walls 406, 408, the first walls 400*a*-400*d*, and the second walls 402 at least partially define or form the plurality of channels 200. In the illustrated example, one of the channels 200 is partially defined by the inner surface 401 of the closure member 116. In other examples, the noise attenuator 126 may not have the outer walls. Instead, the first walls 400*a*-400*d* may extend all the way to the inner surface 401 of the closure member 116 (e.g., the ends of the first walls 400*a*-400*d* may be coupled to the inner surface 401). In such an example, the inner surface 401 of the closure member 116 may at least partially form some of the channels 200.

In the illustrated example, rows or sets of the channels 200 are formed between adjacent ones of the first walls 400*a*-400*d*. For example, referring to FIG. 5, a first row 500*a* of the channels 200 is formed between the first wall 400*a* and the inner surface 401 of the closure member 116, a second row 500*b* of the channels 200 is formed between the first wall 400*a* and the second wall 400*b*, a third row 500*c* of the channels 200 is formed between the second wall 400*b* and the third wall 400*c*, and a fourth row 500*d* of the channels 200 is formed between the third wall 400*c* and the fourth wall 400*d*. The noise attenuator 126 can include any number of the second walls 402, which divide the spaces between adjacent ones of the first walls 400*a*-400*d* into any number of channels (e.g., two, three, four, etc.).

In the illustrated example, each of the walls 400*a*-400*d* is straight or linear in its lengthwise direction. For example, referring back to FIG. 3, the first walls 400*a*-400*d* are straight or linear in the direction of the passageway 104 (i.e., in the direction of the central axis 110) when the noise attenuator 126 is in the fully open position. However, each of the first walls 400*a*-400*d* is curved in their transverse direction. For example, referring briefly to FIG. 11, each of the walls 400*a*-400*d* are curved or bowed in its transverse direction across the passageway 104. Referring back to FIGS. 4-6, each of the first walls 400*a*-400*d* has a continuous curvature between its two ends, i.e., between the first outer wall 406 and the second outer wall 408. In this example, each of the first walls 400*a*-400*d* has an elliptically-shaped curvature. This enables certain ones of the first walls 400*a*-400*d* to align with the seal 118 (FIG. 1) at certain intermediate positions (e.g., at rotational positions of the closure member 116) so that certain rows 500*a*-500*d* are open to the fluid flow. In some examples, each of the first walls 400*a*-400*d* has a different elliptically-shaped curvature, which is based on the ball radius, the seal radius, the seal height and the degree of rotation of the closure member 116. For example, the first walls 400*a*-400*d* may have elliptically-shaped curvatures with different eccentricity values (e). In this example, the eccentricity values (e) of the ellipses decrease from the first wall 400*a* to the fourth wall 400*d*. Said another way, the minor axes of the ellipses increase from the first wall 400*a* to the fourth wall 400*d*. For example, the first wall 400*a* has an elliptically-shaped curvature corresponding to an ellipse with a first eccentricity value, the second wall 400*b* has an elliptically-shaped curvature corresponding to an ellipse with a second eccentricity value lower than the first eccentricity value, the third wall 400*c* has an elliptically-shaped curvature corresponding to an ellipse with a third eccentricity value lower than the second eccentricity value, and so forth. This elliptical design enables the first walls 400*a*-400*d* of the noise attenuator 126 to follow the contact point of the outer surface 119 (FIG. 1) of the closure member 116 on the seal 118 at different rotational positions.

Figure 7:
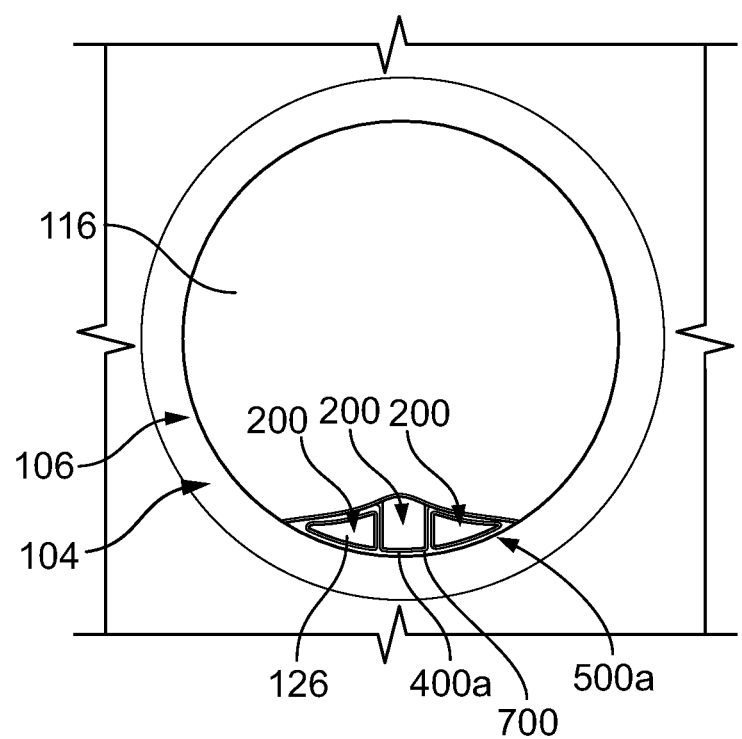
FIG. 7 is an axial view of an inlet of the example rotary ball valve of FIG. 1 with the example closure member and the example noise attenuator in an intermediate position.

For example, FIG. 7 is an axial view of the rotary ball valve 100 from the inlet 106. FIG. 7 shows the closure member 116 and the noise attenuator 126 rotated to an intermediate position, referred to as a first intermediate position. The first intermediate position may correspond to a specific rotational angle of the closure member 116 and the noise attenuator 126, such as 10° open. As shown in FIG. 7, the first wall 400*a* is curved such that when the noise attenuator 126 is in the first intermediate position, an edge 700 of the first wall 400*a* is aligned with the seal 118 (FIG. 1). In other words, the elliptically-shaped curvature of the first wall 400*a* matches the curvature of the passageway 104 and the seal 118 in the axial direction (e.g., when viewed from the inlet 106). Therefore, when the noise attenuator 126 is in the first intermediate position, the channels 200 of the first row 500*a* are fully open to fluid flow from the inlet 106 (i.e., fully open to the inlet 106 in the axial direction). In some instances, having the channels 200 fully open to the fluid flow is advantageous for reducing noise and cavitation as opposed to designs where only portions of each of the channels are exposed to the fluid. In the position shown in FIG. 7, the openings for the other rows 500*b*-500*d* (FIG. 5) are not open or exposed to the incoming fluid. However, fluid can still flow from the channels 200 in the first row 500*a* through the openings 404 (FIG. 4) in the first wall 400*a* and into the other channels 200.

Figure 8:
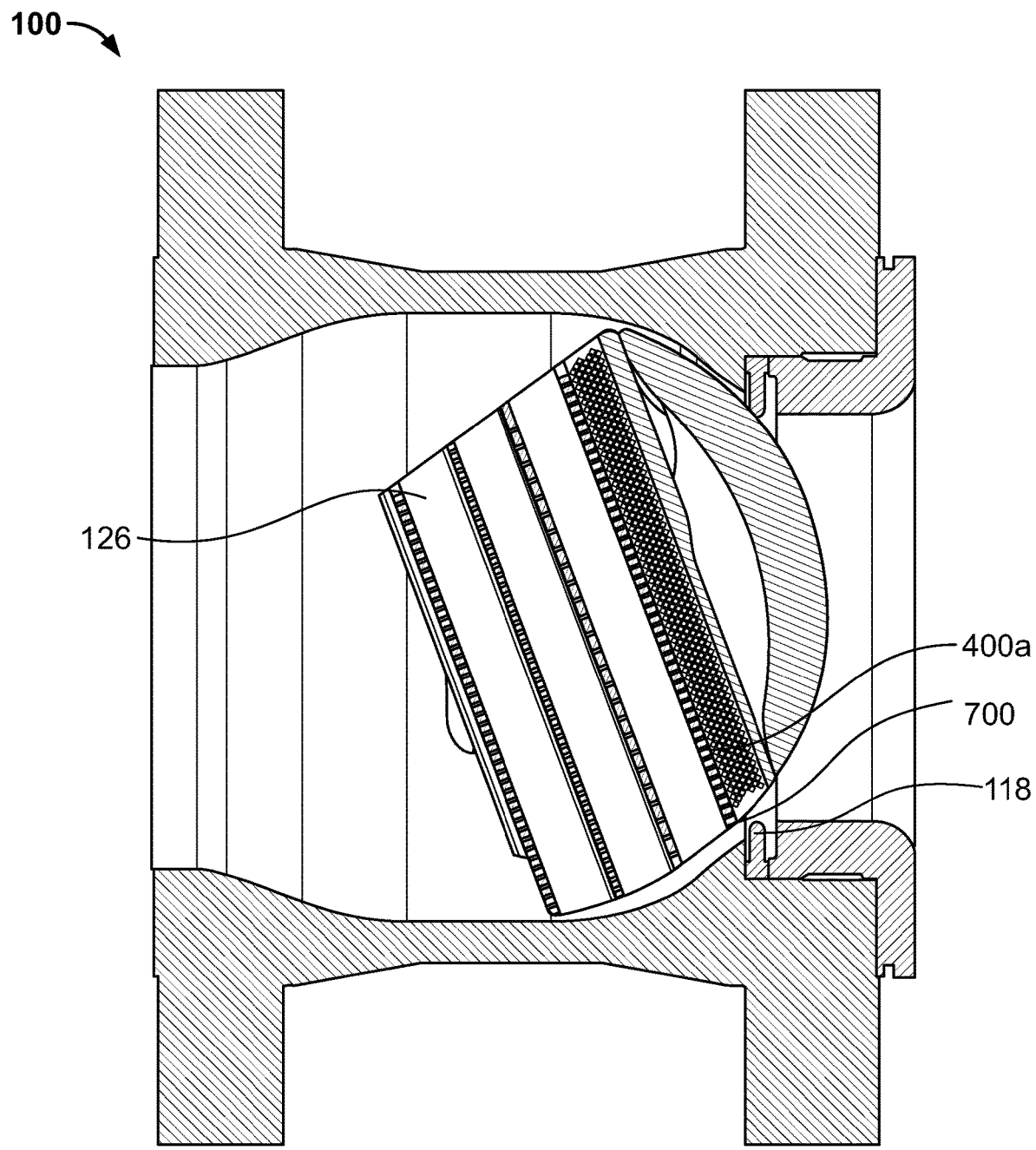
FIG. 8 is a cross-sectional view of the example rotary ball valve of FIG. 1 with the example closure member and the example noise attenuator the same intermediate position as FIG. 7.

FIG. 8 is a cross-sectional view of the example rotary ball valve 100 with the noise attenuator 126 in the first intermediate position. As shown in FIG. 8, the edge 700 of the first wall 400*a* is aligned with the seal 118 in the axial direction.

In particular, the edge 700 is downstream of the seal 118 and aligned along the same radius as the seal 118. In some examples, when the noise attenuator 126 is in this first intermediate position, the edge 700 of the first wall 400a is spaced from the seal 118 (e.g., disposed close to but not engaged with the seal 118). In some instances, this helps prevent wear on the seal 118. In other examples, the edge 700 of the first wall 400a can be engaged with the seal 118 when the noise attenuator 126 is in this first intermediate position. This prevents fluid flow around the edge 700 into the other channels 200 (except through the openings 404 (FIG. 4).

The closure member 116 and the noise attenuator 126 can be similarly rotated to other intermediate positions to align the other walls 400b-400d with the passageway 104 and the seal 118. For example, the second wall 400b is also curved such that when the noise attenuator 126 is in a second intermediate position, an edge of the second wall 400b is aligned with the seal 118. As a result, the channels 200 of the first row 500a and the second row 500b are fully open to fluid flow from the inlet 106, but the openings for the channels 200 of the third and fourth rows 500c, 500d are not open or exposed to the incoming fluid (but may still flow into the rows 500c, 500d through the openings 404 (FIG. 4) in the walls 400a-400d).

Figure 9:
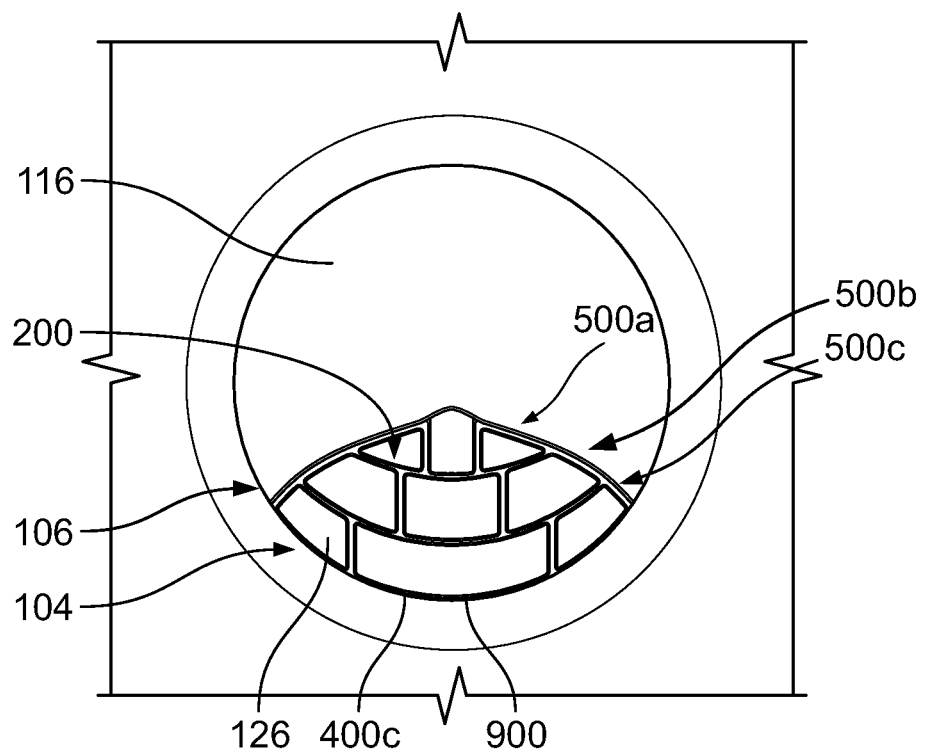
FIG. 9 is an axial view of the inlet of the example rotary ball valve of FIG. 1 with the example closure member and the example noise attenuator in another intermediate position.
Figure 10:
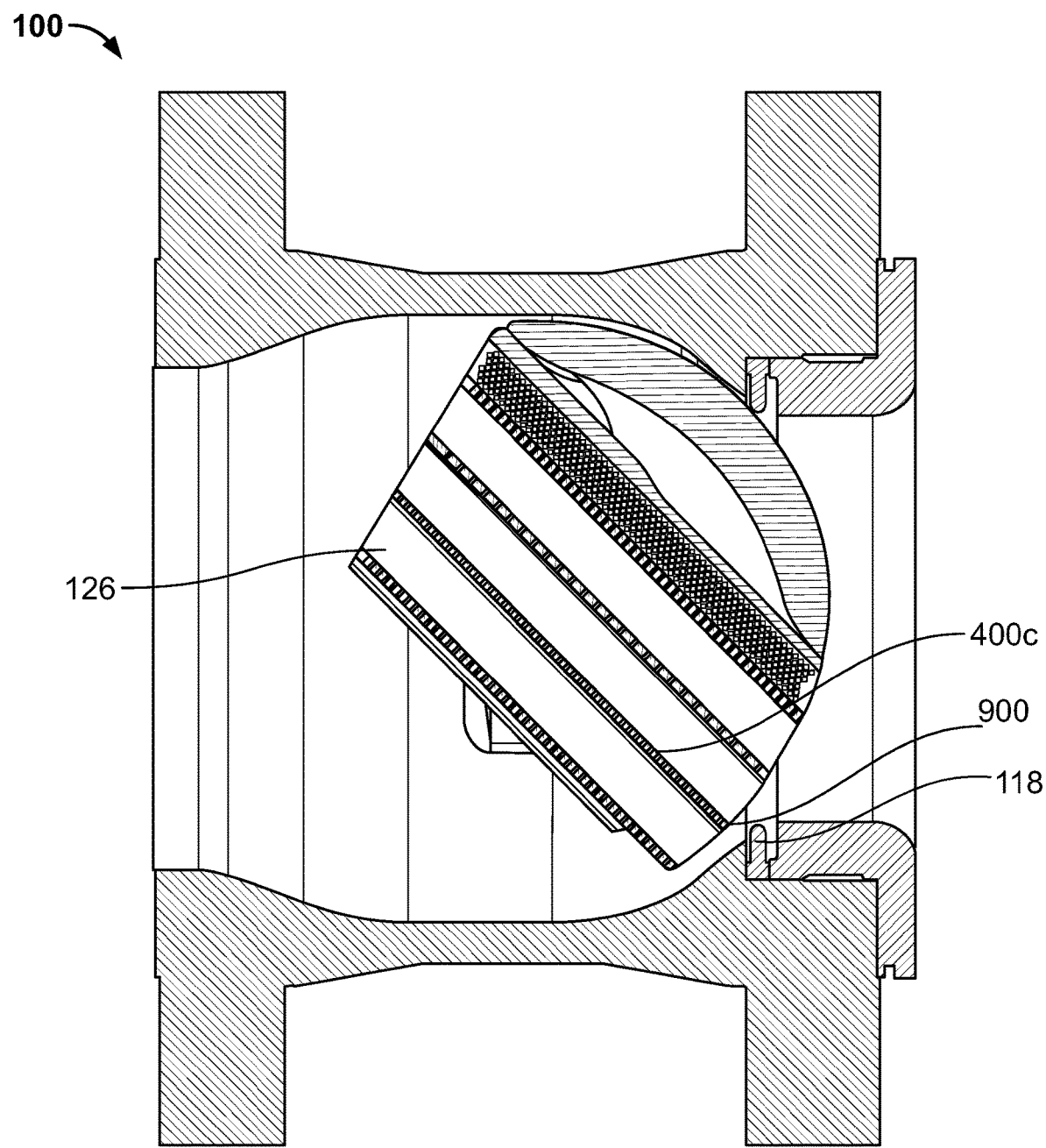
FIG. 10 is a cross-sectional view of the example rotary ball valve of FIG. 1 with the example closure member and the example noise attenuator the same intermediate position as FIG. 9.

FIG. 9 shows the closure member 116 and the noise attenuator 126 rotated to a third intermediate position, in which an edge 900 of the third wall 400c is aligned with a portion of the seal 118 (FIG. 1). When viewed from the inlet 106, the edge 900 for the third wall 400c has an elliptically-shaped curvature that matches the curvature of the passageway 104 and the seal 118. Therefore, in this position, all of the channels 200 (one of which is referenced in FIG. 9) of the first, second, and third rows 500a-500c are fully open to fluid flow from the inlet 106, but the openings for the channels 200 of the fourth row 500d are not open or exposed to the incoming fluid (but may still flow into the fourth row 500d through the openings 404 (FIG. 4) in the walls 400a-400d). FIG. 10 is a cross-sectional view of the example rotary ball valve 100 with the noise attenuator 126 in the third intermediate position. As shown in FIG. 10, the edge 900 of the third wall 400c is aligned with the seal 118 in the axial direction.

The closure member 116 and the noise attenuator 126 can be similarly rotated to a fourth intermediate position in which the fourth wall 400d (FIG. 3) is aligned with the seal 118. Therefore, each of the first walls 400a-400d has an elliptically-shaped curvature such that edges of respective ones of the first walls 400a-400d align with the seal 118 (in an axial direction) at different rotational angles of the noise attenuator 126.

Figure 11:
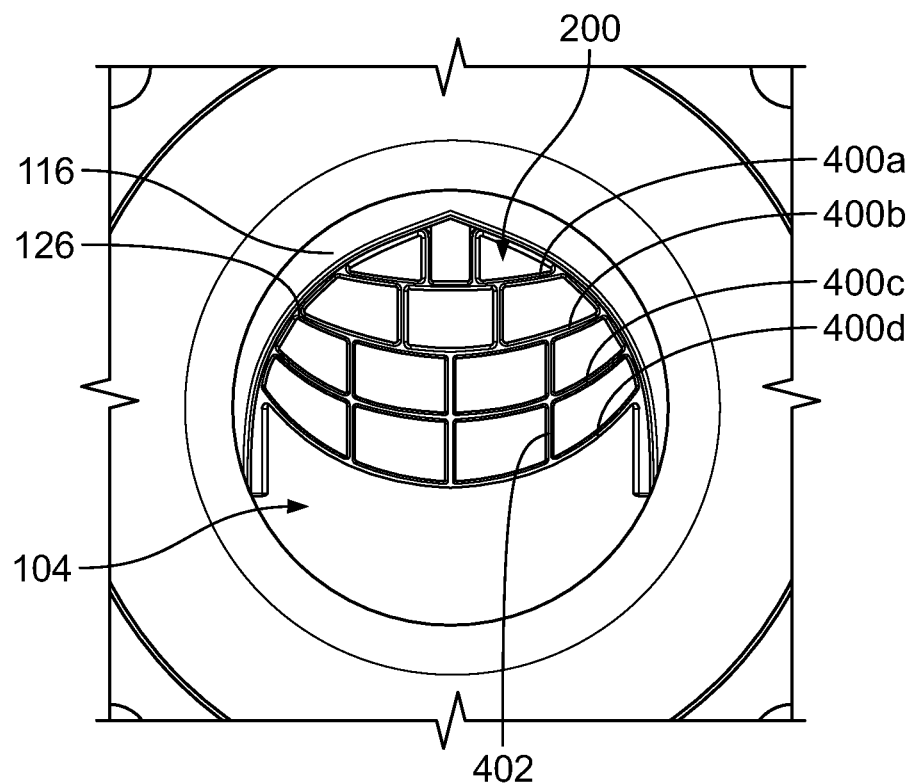
FIG. 11 is an axial view of the inlet of the example rotary ball valve of FIG. 1 with the example closure member and the example noise attenuator in a fully open position.

FIG. 11 shows the closure member 116 and the noise attenuator 126 rotated to the fully open position. In this position, all of the channels 200 (one of which is referenced is FIG. 11) are aligned with the fluid flow through the passageway 104 and are fully open to the fluid flow from the inlet 106.

In some examples, each of the rows 500a-500d of the channels 200 (one of which is referenced in FIG. 11) can be designed to achieve certain flow characteristics. For example, the flow characteristics depend on the distance between adjacent ones of the first walls 400a-400d, the number and distance between the second walls 402 (one of which is referenced in FIG. 11), and/or the number and location of the openings 404 (FIG. 4). These parameters can be chosen (e.g., optimized) to achieve specific flow characteristics. This enables users to customize the flow characteristics (e.g., noise level, cavitation effects, etc.) achieved at certain intermediate positions. For example, when the closure member 116 and the noise attenuator 126 are rotated to the first intermediate position shown in FIG. 7, the resulting flow may produce a first noise level at a first flow rate. When the closure member 116 and the noise attenuator 126 are rotated to the third intermediate position shown in FIG. 8, the resulting flow may produce a second noise level with a second flow rate different than the first noise level and the first flow rate. Therefore, by using the curved, elliptically-shaped walls 400a-400d that align with the seal 118, the rows or sets of channels can be separated so that each row or set of channels can be customized to produce desirable flow characteristics.

In some examples, an actuator or rotating mechanism can be configured or controlled to rotate the closure member 116 to specific rotational positions that corresponding to positions where the walls 400a-400d align with the seal 118. For example, the actuator can be configured to rotate the closure member 116 to the closed position (FIG. 1), a first intermediate position (e.g., 10°) in which the edge 700 of the first wall 400a aligns with the seal 118 (as shown in FIG. 7), a second intermediate position (e.g., 20°) in which the edge of the second wall 400b aligns with the seal 118, a third intermediate position (e.g., 30°) in which the edge 800 of the third wall 400c aligns with the seal 118 (as shown in FIG. 8), a fourth intermediate position (e.g., 45°) in which the edge of the fourth wall 400d aligns with the seal 118, and the fully open position (e.g., 90°) (shown in FIG. 11). The closure member 116 and the noise attenuator 126 can also be rotated to any position between the intermediate positions, where only a portion of certain ones of the channels 200 may be open.

Figure 13:
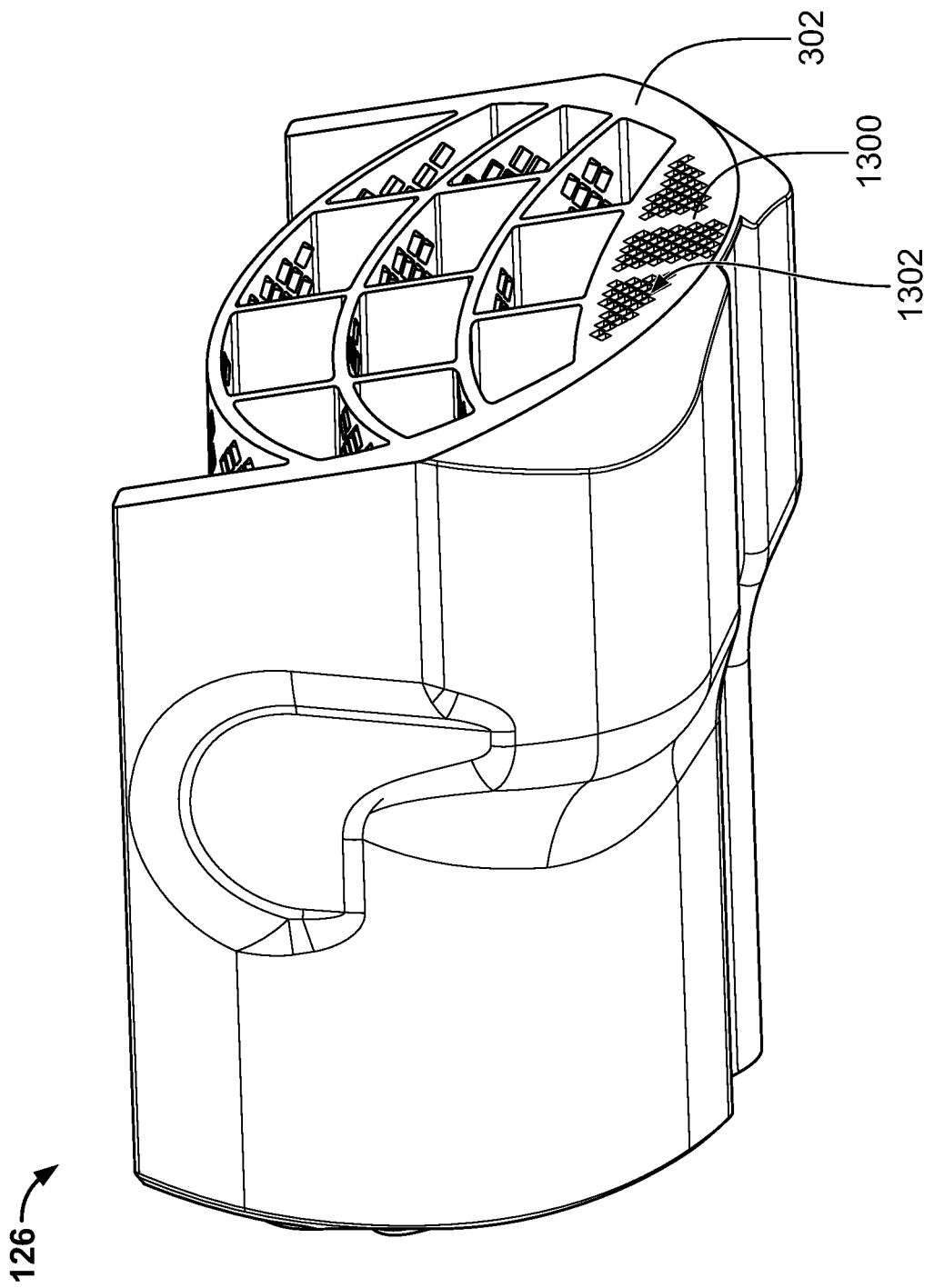
FIG. 13 is a perspective view of a downstream side of the example noise attenuator of FIG. 1 with an example plate on the example downstream side.
Figure 14:
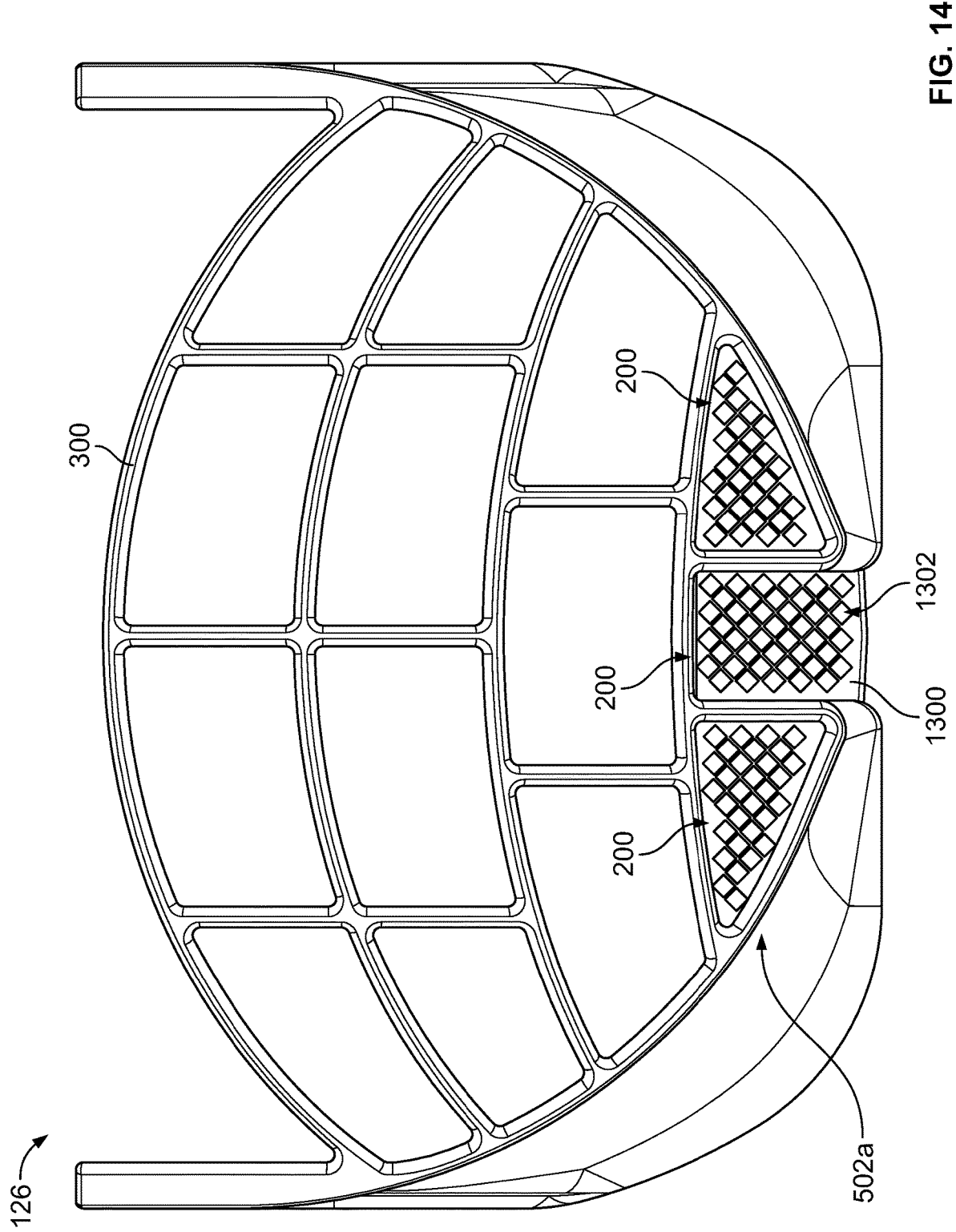
FIG. 14 is an end view of an upstream side of the example noise attenuation of FIG. 13.
Figure 15:
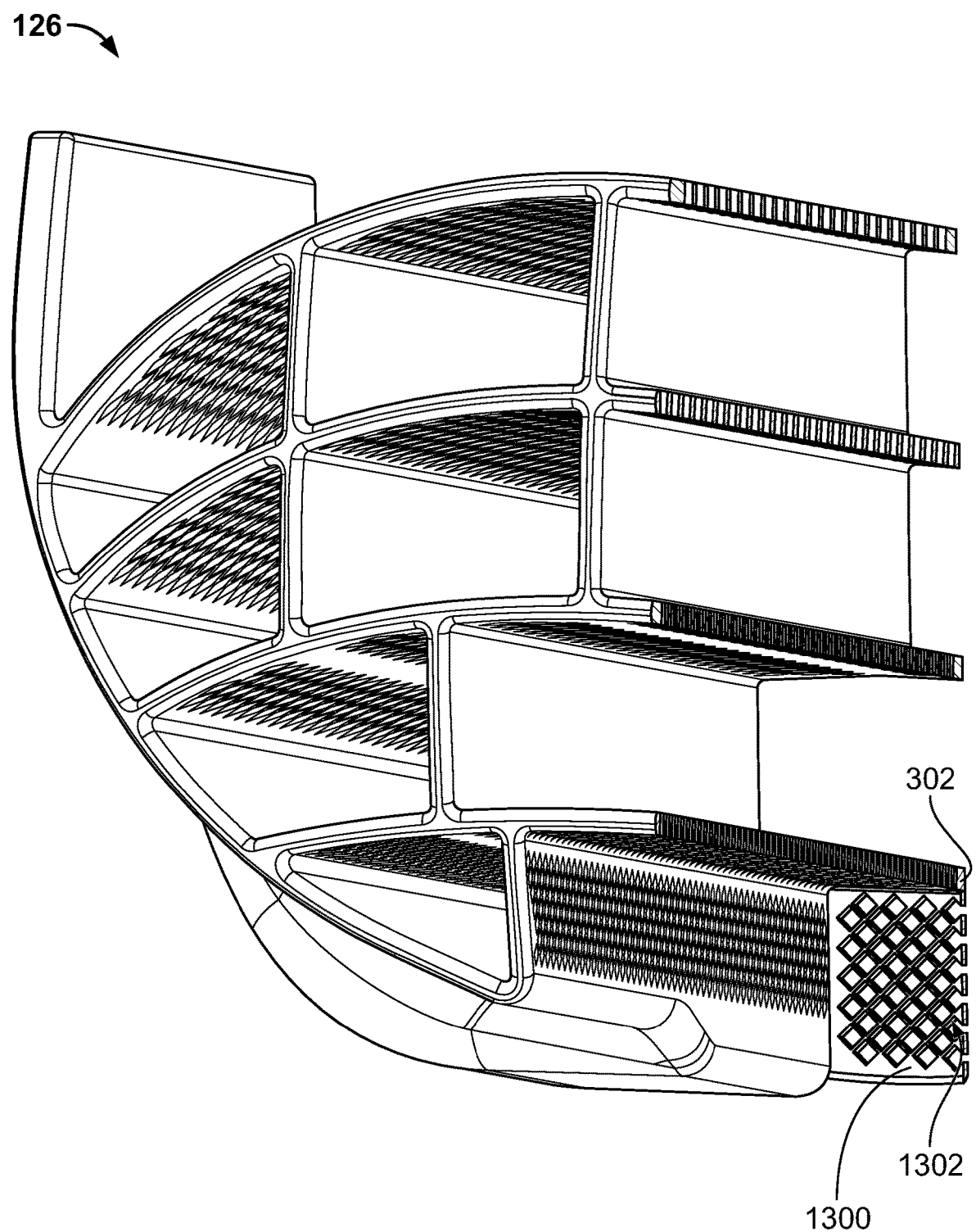
FIG. 15 is a cross-sectioned perspective view of the example noise attenuator and the example plate of FIG. 13.

In some examples, additional structures or materials can be added to one or more of the rows 500a-500d and/or the channels 200 to achieve certain flow characteristic. For example, one or more baffles or plates can be disposed in or near certain ones of rows 500a-500d and/or the channels 200. For example, FIGS. 13-15 show an example plate 1300 coupled to the noise attenuator 126. FIG. 13 is a perspective view of the second end 302 of the noise attenuator 126, FIG. 14 is an end view of the first end 300 of the noise attenuator 126, and FIG. 15 is a cross-sectioned perspective view of the noise attenuator 126. The plate 1300 has a plurality of openings 1302 (one of which is reference in FIGS. 13-15). In this example, the plate 1300 is disposed on the second end 302 of the noise attenuator 126 or in the channels 200 at the second end 302. The plate 1300 is angled to match the angle of the second end 302. However, in other examples, the plate 1300 can be curved or have another angle. In this example, the plate 1300 covers and/or otherwise is disposed in the channels 200 of the first row 500a (FIG. 2), thereby affecting the flow characteristics through the first row 500a of the channels 200. In some examples, the plate 1300 is integral with the noise attenuator 126 (e.g., formed as a monolithic structure with the noise attenuator 126). In other examples, the plate 1300 can be a separate component that is coupled (e.g., via one or more fasteners, welding, etc.) to the noise attenuator 126. In some examples, one or more plates can be used to cover other ones of the rows 500b-500d (FIG. 5) of the channels 200, in addition to or as an alternative to the plate 1300. In some examples, the plates covering the different rows 500a-500d can have different sized openings and/or numbers of openings. As such, each of the rows 500a-500d can achieve different flow characteristics when the noise attenuator 126 is at different rotational angles. In some examples, one or more plates can be disposed in the channels 200, such as between the first and second ends 300, 302 (e.g., near the middle of the channels 200). While in this example the plate 1300 is on or at the downstream side (the second end 302) of the noise attenuator 126, in other examples, the plate 1300 can be coupled to or disposed in the upstream side (the first end 300) of the noise attenuator 126. In such an example, the plate 1300 can be curved or angled differently to match the angle of the first end 300.

The example noise attenuators disclosed herein can also be used in other noise attenuation designs to discretize changes in noise reductions relative to travel. For example, the example noise attenuators disclosed herein can also be used in connection with other types of valves, such as butterfly valves. The example noise attenuators disclosed herein can also be used in connection with valves not having a seal. For example, the closure member 116 can instead engage a shoulder of the valve body 102 in the passageway 104. In such examples, the first walls 400a-400d can be curved to match the curvature of an inner surface of the valve body 104 defining the passageway.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example apparatus, and articles of manufacture have been disclosed that improve noise attenuation and other flow characteristics in rotary ball valves. The curved walls or channels of the example noise attenuators enable certain channels or rows of channels of the noise attenuator to be open at different rotational positions of the closure member. This enables users the ability to customize each channel or row of channels to produce desired flow characteristics (e.g., noise attenuator, cavitation reduction, etc.).

Examples and example combinations disclosed herein include the following:

Example 1 is a rotary ball valve including a valve body defining a passageway between an inlet and an outlet, a ring-shaped seal in the passageway, and a closure member in the passageway. The closure member is rotatable in the passageway relative to the seal. The rotary ball valve also includes a noise attenuator coupled to the closure member in the passageway. The closure member and the noise attenuator are rotatable between a closed position, a fully open position, and a plurality of intermediate positions between the closed position and the fully open position. The noise attenuator includes walls that are spaced apart from each other. The walls at least partially form a plurality of channels. The channels are aligned with the passageway when the noise attenuator is in the fully open position. The walls include a first wall that is curved such that such that when the noise attenuator is in a first intermediate position, an edge of the first wall is aligned with the seal.

Example 2 includes the rotary ball valve of Example 1, wherein the first wall has an elliptically-shaped curvature.

Example 3 includes the rotary ball valve of Examples 1 or 2, wherein the first wall has a continuous curvature.

Example 4 includes the rotary ball valve of any of Examples 1-3, wherein a first row of the channels is formed between the first wall and an inner surface of the closure member, and when the noise attenuator is in the first intermediate position, the channels of the first row are fully open to fluid flow from the inlet.

Example 5 includes the rotary ball valve of Example 4, wherein the walls include a second wall that is curved such that when the noise attenuator is in a second intermediate position, an edge of the second wall is aligned with the seal.

Example 6 includes the rotary ball valve of Example 5, wherein a second row of the channels is formed between the first wall and the second wall, and when the noise attenuator is in the second intermediate position, the channels of the first row and the second row are fully open to fluid flow from the inlet.

Example 7 includes the rotary ball valve of any of Examples 1-6, further including a plate disposed in a first channel of the plurality of channels. The plate has a plurality of openings.

Example 8 includes the rotary ball valve of Example 7, wherein the plate is at or near an end of the noise attenuator.

Example 9 includes the rotary ball valve of any of Examples 1-8, wherein the first wall and a second one of the walls have elliptically-shaped curvatures with different eccentricity values.

Example 10 includes the rotary ball valve of any of Examples 1-9, wherein the walls have openings to enable fluid flow between the channels.

Example 11 includes the rotary ball valve of Example 10, wherein the walls have a triply periodic lattice structure.

Example 12 includes the rotary ball valve of any of Examples 1-11, wherein, when the noise attenuator is in the first intermediate position, the edge of the first wall is spaced from the seal.

Example 13 is a rotary ball valve including a valve body defining a passageway between an inlet and an outlet, a ring-shaped seal in the passageway, and a closure member in the passageway. The closure member is rotatable in the passageway relative to the seal. The rotary ball valve also includes a noise attenuator coupled to the closure member in the passageway. The closure member and the noise attenuator are rotatable between a closed position, a fully open position, and a plurality of intermediate positions between the closed position and the fully open position. The noise attenuator includes a plurality of channels. The noise attenuator includes walls that are spaced apart from each other. The walls at least partially define the channels. The walls include a first wall having an elliptically-shaped curvature such that when the noise attenuator is in a first intermediate position, the elliptically-shaped curvature of the first wall matches a curvature of the seal in an axial direction.

Example 14 includes the rotary ball valve of Example 13, wherein the first wall has a continuous curvature.

Example 15 includes the rotary ball valve of Examples 13 or 14, wherein a first row of the channels is formed between the first wall and an inner surface of the closure member, and when the noise attenuator is in the first intermediate position, the channels of the first row are fully open to fluid flow from the inlet.

Example 16 includes the rotary ball valve of Example 15, wherein the walls include a second wall having an elliptically-shaped curvature such that when the noise attenuator is in a second intermediate position, the elliptically-shaped curvature of the second wall matches the curvature of the seal in the axial direction.

Example 17 includes the rotary ball valve of Example 16, wherein the elliptically-shaped curvature of the first wall and the elliptically-shaped curvature of the second wall have different eccentricity values.

Example 18 is a noise attenuator for a rotary ball valve. The noise attenuator includes a first outer wall, a second outer wall, first walls extending between the first outer wall and the second outer wall, the first walls spaced apart from each other, and second walls. At least some of the second walls extend between adjacent ones of the first walls. The first and second outer walls, the first walls, and the second walls define a plurality of channels. Each of the first walls has an elliptically-shaped curvature such that edges of respective ones of the first walls align with a seal in the rotary ball valve at different rotational angles of the noise attenuator.

Example 19 includes the noise attenuator of Example 18, wherein each of the first walls has a continuous curvature between the first and second outer walls.

Example 20 includes the noise attenuator of Examples 18 or 19, wherein the first walls have a triply periodic lattice structure.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A rotary ball valve comprising:
   a valve body defining a passageway between an inlet and an outlet;
   a ring-shaped seal in the passageway;
   a closure member in the passageway, the closure member rotatable in the passageway relative to the seal; and
   a noise attenuator coupled to the closure member in the passageway, the closure member and the noise attenuator rotatable between a closed position, a fully open position, and a plurality of intermediate positions between the closed position and the fully open position, the noise attenuator including a first outer wall, a second outer wall, and channel walls, the channel walls being spaced apart from each other, the channel walls at least partially forming a plurality of channels, the channels being aligned with the passageway when the noise attenuator is in the fully open position, the channel walls including a first channel wall, the first channel wall extending between the first outer wall and the second outer wall, the first channel wall being curved such that when the noise attenuator is in a first intermediate position, an edge of the first channel wall is aligned with the seal between the first outer wall and the second outer wall, the channel walls including a second channel wall, the second channel wall extending between the first outer wall and the second outer wall, the second channel wall being curved such that when the noise attenuator is in a second intermediate position, an edge of the second channel wall is aligned with the seal between the first outer wall and the second outer wall.

2. The rotary ball valve of claim 1, wherein the first channel wall has an elliptically-shaped curvature.

3. The rotary ball valve of claim 1, wherein the first channel wall has a continuous curvature.

4. The rotary ball valve of claim 1, wherein a first row of the channels is partially formed between the first channel wall and an inner surface of the closure member, and when the noise attenuator is in the first intermediate position, the channels of the first row are fully open to fluid flow from the inlet.

5. The rotary ball valve of claim 4, wherein a second row of the channels is formed between the first channel wall and the second channel wall, and when the noise attenuator is in the second intermediate position, the channels of the first row and the second row are fully open to fluid flow from the inlet.

6. The rotary ball valve of claim 1, wherein the first channel wall and a second one of the channel walls have elliptically-shaped curvatures with different eccentricity values.

7. The rotary ball valve of claim 1, wherein the channel walls have openings to enable fluid flow between the channels.

8. The rotary ball valve of claim 1, wherein, when the noise attenuator is in the first intermediate position, the edge of the first channel wall is spaced from the seal.

9. The rotary ball valve of claim 1, wherein the first and second outer walls of the noise attenuator are engaged with an inner surface of the closure member.

10. A rotary ball valve comprising:
    a valve body defining a passageway between an inlet and an outlet;
    a ring-shaped seal in the passageway;
    a closure member in the passageway, the closure member rotatable in the passageway relative to the seal;

a noise attenuator coupled to the closure member in the passageway, the closure member and the noise attenuator rotatable between a closed position, a fully open position, and a plurality of intermediate positions between the closed position and the fully open position, the noise attenuator including a first outer wall, a second outer wall, and channel walls, the channel walls being spaced apart from each other, the channel walls at least partially forming a plurality of channels, the channels being aligned with the passageway when the noise attenuator is in the fully open position, the channel walls including a first channel wall, the first channel wall extending between the first outer wall and the second outer wall, the first channel wall being curved such that when the noise attenuator is in a first intermediate position, an edge of the first channel wall is aligned with the seal between the first outer wall and the second outer wall; and a plate disposed in a first channel of the plurality of channels, the plate having a plurality of openings.

11. The rotary ball valve of claim 10, wherein the plate is at or near an end of the noise attenuator.

12. A rotary ball valve comprising:
a valve body defining a passageway between an inlet and an outlet;
a ring-shaped seal in the passageway;
a closure member in the passageway, the closure member rotatable in the passageway relative to the seal; and
a noise attenuator coupled to the closure member in the passageway, the closure member and the noise attenuator rotatable between a closed position, a fully open position, and a plurality of intermediate positions between the closed position and the fully open position, the noise attenuator including walls that are spaced apart from each other, the walls at least partially forming a plurality of channels, the channels being aligned with the passageway when the noise attenuator is in the fully open position, the walls including a first wall that is curved such that when the noise attenuator is in a first intermediate position, an edge of the first wall is aligned with the seal, wherein the walls have openings to enable flow between the channels, and wherein the walls have a triply periodic lattice structure.

13. A rotary ball valve comprising:
a valve body defining a passageway between an inlet and an outlet;
a ring-shaped seal in the passageway;
a closure member in the passageway, the closure member rotatable in the passageway relative to the seal, the closure member having a first inner surface and a second inner surface; and
a noise attenuator coupled to the closure member in the passageway, the closure member and the noise attenuator rotatable between a closed position, a fully open position, and a plurality of intermediate positions between the closed position and the fully open position, the noise attenuator including a plurality of channels, the noise attenuator including walls that are spaced apart from each other, the walls at least partially defining the channels, the walls including a first wall, the first wall extending between the first inner surface and the second inner surface of the closure member, the first wall having an elliptically-shaped curvature such that when the noise attenuator is in a first intermediate position, the elliptically-shaped curvature of the first wall between the first inner surface and the second inner surface matches a curvature of the seal in an axial direction.

14. The rotary ball valve of claim 13, wherein the first wall has a continuous curvature.

15. The rotary ball valve of claim 13, wherein a first row of the channels is formed between the first wall and an inner surface of the closure member, and when the noise attenuator is in the first intermediate position, the channels of the first row are fully open to fluid flow from the inlet.

16. The rotary ball valve of claim 15, wherein the walls include a second wall having an elliptically-shaped curvature such that when the noise attenuator is in a second intermediate position, the elliptically-shaped curvature of the second wall matches the curvature of the seal in the axial direction.

17. The rotary ball valve of claim 16, wherein the elliptically-shaped curvature of the first wall and the elliptically-shaped curvature of the second wall have different eccentricity values.

18. A noise attenuator for a rotary ball valve, the noise attenuator comprising:
a first outer wall;
a second outer wall;
first walls extending between the first outer wall and the second outer wall, the first walls spaced apart from each other; and
second walls, at least some of the second walls extending between adjacent ones of the first walls, wherein the first and second outer walls, the first walls, and the second walls define a plurality of channels, and wherein each of the first walls has an elliptically-shaped curvature such that edges of respective ones of the first walls align with a seal at different rotational angles of the noise attenuator, the first walls having a triply periodic lattice structure.

19. The noise attenuator of claim 18, wherein each of the first walls has a continuous curvature between the first and second outer walls.

* * * * *